(12) United States Patent
Hibi et al.

(10) Patent No.: US 9,962,636 B2
(45) Date of Patent: May 8, 2018

(54) FUEL FILTRATION DEVICES

(71) Applicant: AISAN KOGYO KABUSHIKI KAISHA, Obu-shi, Aichi-ken (JP)

(72) Inventors: Kazunori Hibi, Ogaki (JP); Koji Yoshida, Kasugai (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 406 days.

(21) Appl. No.: 13/963,051

(22) Filed: Aug. 9, 2013

(65) Prior Publication Data

US 2014/0042079 A1    Feb. 13, 2014

(30) Foreign Application Priority Data

Aug. 10, 2012    (JP) ................. 2012-177976

(51) Int. Cl.
*B01D 35/00* (2006.01)
*B01D 35/027* (2006.01)
*B01D 29/11* (2006.01)
*F02M 37/22* (2006.01)

(52) U.S. Cl.
CPC .......... *B01D 35/005* (2013.01); *B01D 29/111* (2013.01); *B01D 35/0273* (2013.01); *B01D 2201/0423* (2013.01); *F02M 2037/228* (2013.01)

(58) Field of Classification Search
None
See application file for complete search history.

(56) References Cited

U.S. PATENT DOCUMENTS

| | | | | |
|---|---|---|---|---|
| 2,851,390 A | * | 9/1958 | Chavannes | A41D 31/0016 156/252 |
| 3,857,670 A | * | 12/1974 | Karlovetz | D06F 67/02 431/329 |
| 5,375,629 A | | 12/1994 | Wilson | |
| 5,716,522 A | * | 2/1998 | Chilton | B01D 29/111 210/317 |
| 5,902,480 A | | 5/1999 | Chilton et al. | |

(Continued)

FOREIGN PATENT DOCUMENTS

| | | |
|---|---|---|
| EP | 1495789 A1 | 1/2005 |
| JP | 2000-246026 A | 9/2000 |

(Continued)

OTHER PUBLICATIONS

Title: Machine translation of JP2006220024A Author:JPO Date: Aug. 2006.*

(Continued)

*Primary Examiner* — Bobby Ramdhanie
*Assistant Examiner* — Michael J An
(74) *Attorney, Agent, or Firm* — Conley Rose, P.C.

(57) ABSTRACT

A fuel filtration device may include a filter element and a space-keeping member. The filter element may have a plurality of fusion-bonded portions and have a space defined therein. The space-keeping member may have crosspieces defining openings therebetween and may face a surface of the filter element in a facing direction. The fusion-bonded portions may include those that do not overlap with the crosspieces of the space-keeping member in the facing direction.

10 Claims, 5 Drawing Sheets

(56) References Cited

U.S. PATENT DOCUMENTS

| | | | | |
|---|---|---|---|---|
| 6,193,773 | B1* | 2/2001 | Schlor | A47L 9/14 |
| | | | | 15/347 |
| 6,840,387 | B2* | 1/2005 | Beer | B01D 39/083 |
| | | | | 156/290 |
| 7,029,582 | B2* | 4/2006 | Sato | B01D 35/0273 |
| | | | | 210/232 |
| 7,083,722 | B2* | 8/2006 | McGaw, Jr. | B29C 65/08 |
| | | | | 156/580.1 |
| 2004/0222143 | A1* | 11/2004 | Kojima | B01D 35/0273 |
| | | | | 210/416.4 |
| 2005/0045566 | A1* | 3/2005 | Larkin | B01D 39/083 |
| | | | | 210/767 |
| 2009/0120858 | A1* | 5/2009 | Kojima | B01D 35/0273 |
| | | | | 210/167.08 |

FOREIGN PATENT DOCUMENTS

| | | | | |
|---|---|---|---|---|
| JP | 2004218607 | * | 5/2004 | F02M 37/22 |
| JP | 2004218607 A | | 8/2004 | |
| JP | 200530351 A | | 2/2005 | |
| JP | 2005030351 | * | 3/2005 | F02M 37/22 |
| JP | 2006-220024 A | | 8/2006 | |
| JP | 2006220024 A | * | 8/2006 | F02M 37/10 |
| JP | 2006220024 A | | 8/2006 | |
| JP | 2008-229593 A | | 10/2008 | |
| JP | WO 2012/053582 A1 | * | 4/2012 | |
| JP | 2012-087725 A | | 5/2012 | |
| JP | 2012-132365 A | | 7/2012 | |
| WO | WO 2011/160829 A3 | * | 12/2011 | |

OTHER PUBLICATIONS

Title: Machine translation of JP2004218607 Author:JPO Date: May 2004.*
Title: Machine translation of JP2005030351 Author:JPO Date: Mar. 2005.*
Machine Translation of JP 2006220024, Filter device, Aug. 24, 2006, Nobuyuki, pp. 1-12.*
Chinese Patent Application No. 201310313690.1 Office Action dated Apr. 24, 2015 (14 pages).
Japanese Patent Application No. 2012-177976 Notification of Reasons for Refusal dated Apr. 12, 2016 (8 pages).

* cited by examiner

1

FUEL FILTRATION DEVICES

This application claims priority to Japanese patent application serial number 2012-177976, the contents of which are incorporated herein by reference.

BACKGROUND OF THE INVENTION

Field of the Invention

Embodiments of the present invention relate to fuel filtration devices that may be mounted within fuel tanks and connected to fuel inlet members, through which fuel may be drawn.

Known fuel filtration devices, such as a fuel filtration device disclosed in JP-A-2006-220024, may include a filter member and a space-keeping member. The filter member may include a bag-shaped filter element formed by a plurality of flat filter elements that overlap each other and are integrated together at fusion-bonded portions distributed in a dotted fashion. The space-keeping member may include a grid-like space-keeping portion disposed within a space defined in the filter element. The fuel filtration device may be disposed within a fuel tank, and the space within the filter element may communicate with a fuel inlet member, through which fuel may be drawn.

In known fuel filtration devices, the fusion-bonded portions of the filter element are distributed at positions where the filter element is overlapped with crosspieces of the space-keeping portion or positions proximal to the crosspieces, as viewed in an overlapping direction of the filter element with the space-keeping portion. With this arrangement, there has been the problem that portions of the filter element facing the openings of the grid of the space-keeping portion may swell due to the action of the fuel.

Therefore, there has been a need in the art for inhibiting the portions of a filter element, which face openings of a space-keeping portion of a space-keeping member, from swelling due to the action of the fuel.

SUMMARY OF THE INVENTION

In one aspect according to the present teachings, a fuel filtration device may include a filter element and a space-keeping member. The filter element may have a plurality of fusion-bonded portions and have a space defined therein. The space-keeping member may have crosspieces defining openings therebetween and may face a surface of the filter element in a facing direction. The fusion-bonded portions may include those that do not overlap with the crosspieces of the space-keeping member in the facing direction.

DETAILED DESCRIPTION OF THE INVENTION

Figure 1:
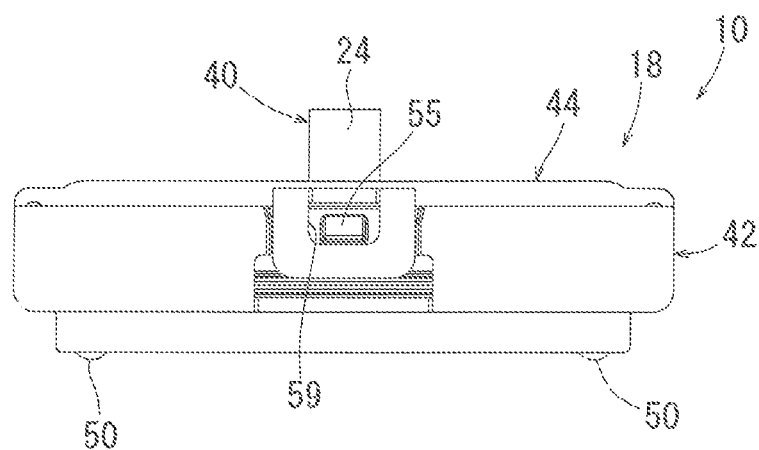
FIG. 1 is a front view of a fuel filtration device according to a first embodiment.

Each of the additional features and teachings disclosed above and below may be utilized separately or in conjunction with other features and teachings to provide improved fuel filtration devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one embodiment, a fuel filtration device may include a filter member and a space-keeping device. The filter member may include a filter element formed by a plurality of filter sheets overlapping each other and joined together at a plurality of fusion-bonded portions. The filter element may have a space defined therein. The space-keeping device may include a grid-shaped space-keeping member having crosspieces. The space-keeping member may face an inner surface or an outer surface of the filter element. The space defined in the filter element may communicate with a fuel inlet member disposed within a fuel tank, so that fuel is drawn from the fuel tank via the fuel inlet member. As viewed in an overlapping direction of the filter element and the space-defining member, the crosspieces of the space-keeping member may be arranged such that the crosspieces are positioned between the fusion-bonded portions so as to be spaced apart from the fusion-bonded portions.

With this arrangement, the fusion-bonded portions may be positioned at opening opposing portions of the fuel element opposed to openings of the space-defining member. Therefore, it is possible to inhibit the opening opposing portions from swelling due to the action of fuel. In addition, portions of the filter element positioned at intermediate positions between the fusion-welded portions may be inhibited from swelling due to the action of fuel due to the presence of the crosspieces of the space-keeping member.

The filter element may have a bag shape, and the space-keeping device may be disposed within the space of the filter element. In this way, the space-keeping device may ensure a given distance or volume of space within the filter element. As a result, it is possible to prevent a reduction in the fuel passage area of the space and to reduce the loss of fuel pressure.

Additionally or alternatively, the space-keeping device may be disposed on an outer side of the filter element so as to be positioned between a surface of the fuel tank and a surface of the filter element which is opposed to the surface of the fuel tank. In this way, the space-keeping device may ensure a given distance or volume of space between the opposing surfaces of the fuel tank and the filter element. As a result, the filter element may not suffer damage, such as perforation or breakage, which may be caused due to contact with the surface of the fuel tank.

The filter member may further include a connecting member connected to the fuel inlet member. The filter element may include a region opposite the connecting member. As viewed in an axial direction of the connecting member, at least one of the fusion-bonded portions may be positioned within the region opposite the connecting member. In this way, it is possible to further prevent the connecting member opposing region from swelling or flexing due to the action of the drawn fuel. As a result, it is possible to prevent a reduction in the flow passage area of the space in the filter element and prevent blockage of the fuel inlet member which may be caused by the flexing of the connection member opposing region of the filter element. As a result, it is also possible to inhibit a loss of fuel pressure in this respect.

Embodiments of the present invention will now be described with reference to the drawings.

First Embodiment

A first embodiment will be described with reference to FIGS. 1 to 4. Referring to FIG. 3, a fuel filtration device 10 may be disposed within a fuel tank 12 at a position on a bottom or a flat bottom wall portion 13 of the fuel tank 12. The fuel filtration device 10 may be connected to a fuel inlet member 14, through which fuel is drawn. More specifically, a fuel pump (not shown) may have the fuel inlet member 14 or may be connected to the fuel inlet member 14. As the fuel pump is driven, fuel stored within the fuel tank 12 may be drawn via the fuel inlet member 14 after the fuel filtration device 10 filtrates the fuel for removing foreign materials from the fuel. The fuel pressurized by the fuel pump may then be supplied to an engine, such as an internal combustion engine (not shown).

The fuel filtration device 10 may include a filter member 16 and a filter case 18. The filter case 18 may receive the filter member 16 therein. The filter member 16 may include a substantially flat rectangular bag-shaped filter element 20 defining a hollow space 21 therein, an inner frame member 22 disposed within the space 21, and a connecting tube 24 extending vertically upward from the inner frame member 22. The connecting tube 24 may extend upwardly though an upper part of the filter element 20, while the outer surface of the connecting tube 24 is hermetically sealed against the upper part of the filter element 20. The filter element 20 may include an upper filter element 20A and a lower filter element 20B. The upper filter element 20A and the lower filter element 20B may be joined together at an outer peripheral portion 20a of the filter element 20 by fusion-bonding, so that the filter element 20 may be sealed throughout the circumferential length of the outer peripheral portion 20a. Alternatively, the filter element 20 may include a single filter element that is folded in the middle and fusion-bonded at its outer peripheral portion so as to be sealed throughout its circumferential length.

Each of the upper and lower filter elements 20A and 20B may be formed by joining a plurality of filter sheets at a plurality of fusion-bonded portions 26 distributed in a dotted fashion. For example, all of the filter sheets may be made of a same resin material. Alternatively, some of the filter sheets may be made of a first resin material, and the remaining filter sheets may be made of a second resin material that is different from the first resin material. Otherwise, some of the filter sheets may be made of resin, and the remaining filter sheets may be made of non-resin material. In brief, the filter sheets are preferably made of any material or materials which can be joined together by fusion bonding. The fusion-bonded portions 26 may be formed by heating the layered filter sheets at points distributed in a dotted fashion to fuse portions of the layered filter sheets. Afterwards, the fused portions can be cooled and solidified. In this way, the fusion-bonded portions 26 may be distributed over substantially the entire area of each of the filter elements 20A and 20B.

The inner frame member 22 disposed within the space 21 of the filter element 20 may be made of resin and may have a grid-like plate member 28. The plate member 28 may include a rectangular frame portion 29 and a plurality of crosspieces 30 that extend diagonally in forward and rearward directions so as to intersect each other within the rectangular frame portion 29 (see FIG. 4). Intersecting portions where the crosspieces 30 intersect with each other and intersecting portions where the crosspieces 30 intersect with the frame portion 29 are indicated by reference numeral 31. Reference numeral 32 indicates openings that may include those having a rectangular shape (rhombic shape) and formed between the crosspieces 30 and may also include those having a triangular shape and formed between the crosspieces 30 and the frame portion 29. The openings 32 may extend throughout the thickness of the plate member 28 (in a vertical direction as viewed in FIG. 3). The plate member 28 may face the upper filter element 20A, and more specifically the inner surface (lower surface in FIG. 3) of the upper filter element 20A. In this way, the plate member 28 can contact the upper filter element 20A in a face-to-face contact relationship therewith. A plurality of legs 33 may extend downwardly from the intersecting portions 31, so that the leading ends (lower ends in FIG. 4) of the legs 33 can contact the lower filter element 20B and, in particular, the inner surface (upper surface in FIG. 3) of the lower filter element 20B. The plate member 28 and the legs 33 may serve as a space-keeping member 34 for keeping a given volume or distance of space 21 between the upper filter element 20A and the lower filter element 20B (see FIG. 3). In other words, the space-keeping member 34 may keep a distance between the inner surface of the upper filter element 20A and the inner surface of the lower filter element 20B, which are opposed to each other in the vertical direction.

At the central portion of the plate member 28, a substantially cylindrical tubular connecting portion 36 may be formed to extend upwardly from the plate member 28. The connecting portion 36 may be opened at its opposite ends. The connecting portion 36 may be fitted into a fitting hole 37 formed in the central portion of the upper filter element 20A so as to extend therethough. The lower end of the connecting tube 24 may be fitted on the upper end of the connecting portion 36 and may be sealingly connected thereto by welding or similar technique. For this reason, the connecting tube 24 may be made of resin. The peripheral portion of the fitting hole 37 of the upper filter element 20A may be clamped between the plate member 28 and the connecting tube 24 and may be sealingly joined to the plate member 28 and the connecting tube 24 by welding or like technique. In this way, the inner space of the connecting tube 24 may communicate with the space 21 of the filter member 16 via the inner space of the connecting tube 24. The connecting portion 36 and the connecting tube 24 may serve as a connecting member 40 for connection with the fuel inlet member 14. The inner frame member 22 may serve as a space-keeping device or an inner device disposed inside of the filter member 16.

Figure 3:
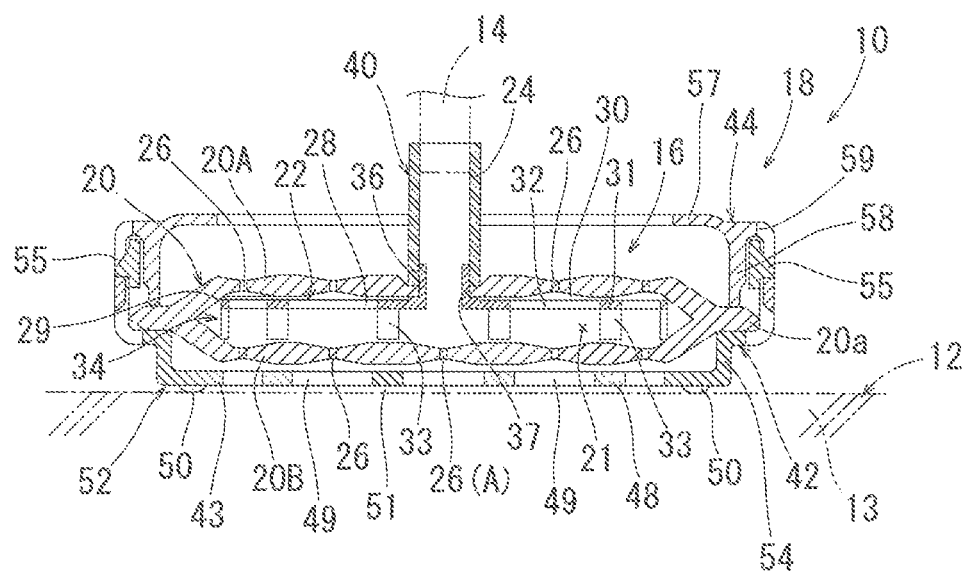
FIG. 3 is a sectional view taken along line III-III in FIG. 2.
Figure 4:
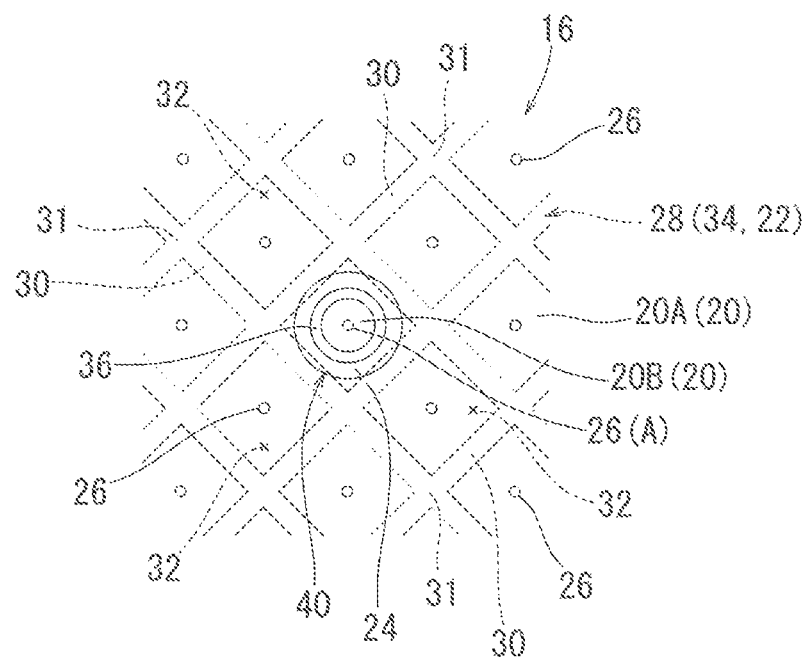
FIG. 4 is a plan view of a part of a filter member of the fuel filtration device.

As viewed from the upper side with respect to the overlapping direction of the upper filter element 20A over the space-keeping member 34 of the inner frame member 22 (i.e., the upper side as viewed in FIG. 3), the crosspieces 30 of the space-keeping member 34 may be positioned between the fusion-bonded portions 26 of the upper filter element 20A so as to be spaced apart from the fusion-bonded portions 26 (see FIG. 4). In addition, at the central portion of each of the openings 32 of the space-keeping member 34, preferably only one fusion-bonded portion 26 of the fusion-bonding portions 26 of the upper filter element 20A is positioned there. The lower filter element 20B may include a region opposite the connecting member 40 (i.e., a region including a directly opposed portion positioned directly below the connecting member 40 and a peripheral portion of the directly opposed portion). Further, as viewed from the upper side with respect to the axial direction of the connecting member 40 (upper side as viewed in FIG. 3), one fusion-bonding portion (indicated by reference numeral 26(A)) of the fusion-bolding portions 26 of the lower filter element 20B is positioned within the connecting member opposing region of the lower filter element 20B opposed to the connecting member 40 (see FIG. 4).

Figure 2:
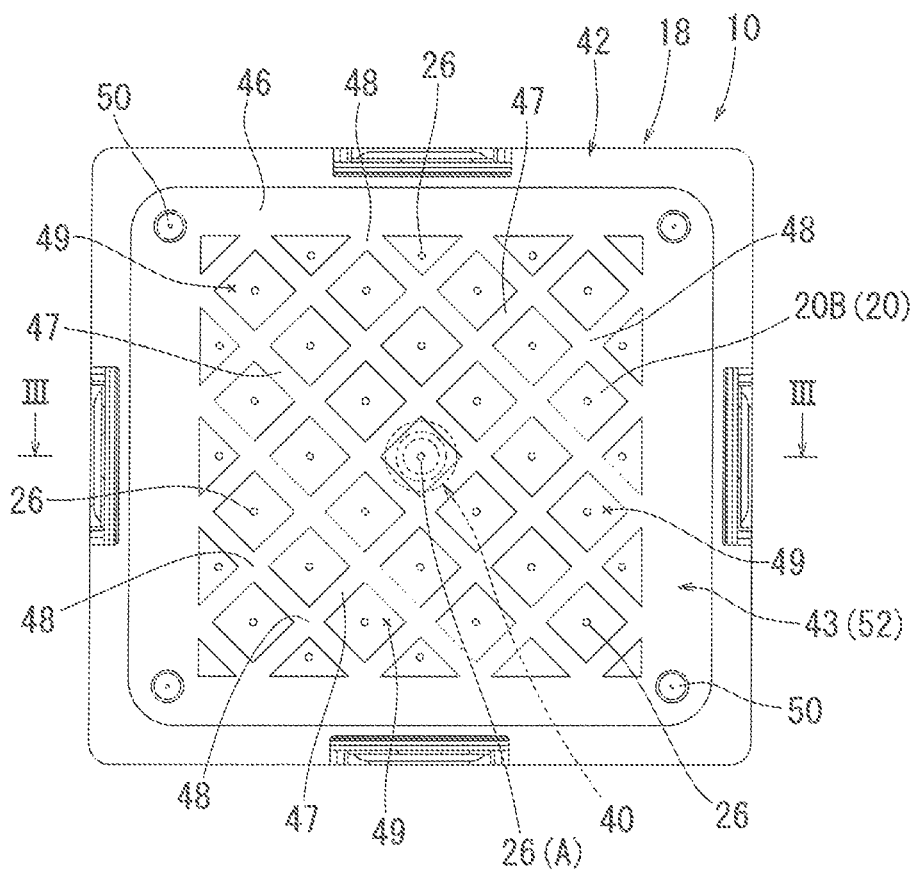
FIG. 2. is a bottom view of the fuel filtration device.

As shown in FIGS. 1 to 3, the filter case 18 may have a substantially flat rectangular box shape. The filter case 18 may be divided vertically into two parts, i.e., a cover 44 and a case body 42. The case body 42 may have a shallow rectangular box shape with a closed bottom and an opened top. The filter member 16 may be received within the case body 42 (see FIG. 3). In other words, the case body 42 may be disposed on the outer side of the filter member 16. A bottom plate 43 of the case body 42 may have a grid-like shape. More specifically, as shown in FIG. 2, the bottom plate 43 may have a rectangular frame portion 46 and a plurality of crosspieces 47 that extend diagonally in forward and rearward directions so as to intersect each other within the rectangular frame portion 46. Intersecting portions where the crosspieces 47 intersect with each other and intersecting portions where the crosspieces 47 intersect with the frame portion 46 are indicated by reference numeral 48. Reference numeral 49 indicates openings that may include those having a rectangular shape (rhombic shape) and formed between the crosspieces 47 and may also include those having a triangular shape and formed between the crosspieces 47 and the frame portion 46. The openings 49 may extend throughout the thickness of the bottom plate 43 (in a vertical direction as viewed in FIG. 3). The bottom plate 43 may face the lower filter element 20B of the filter member 16 and, more specifically, the outer surface (lower surface) of the lower filter element 20B. In this way, the bottom plate 43 can contact the lower filter element 20B in a face-to-face contact relationship therewith. Hemispherical support projections 50 may extend downwardly from four corner portions of the frame portion 46. The support projections 50 may contact the bottom wall portion 13 of the fuel tank 12, so that a clearance 51 may be formed between the bottom plate 43 of the case body 42 and the bottom wall portion 13 of the fuel tank 12 to allow fuel to flow though the clearance 51 (see FIG. 3). In this way, the bottom plate 43 and the support projections 50 may serve as a space-keeping member 52 for keeping a given volume or a given distance of a space (i.e., the clearance 51) between the bottom plate 43 of the case body 42 and the bottom wall portion 13 of the fuel tank 12.

Referring to FIG. 3, the case body 42 may have four side plates 54 each formed with an engaging claw 55. The cover 44 may have a shallow rectangular box shape with an opened top and an opened bottom. More specifically, the cover 44 may have a top plate 57 and four side plates 58. The top plate 57 may have a shape like a frame formed in continuity with the four side plates 58. Each of the side plates 58 may be formed with an engaging hole 59. The engaging claws 55 of the case body 42 may engage the engaging holes 59 of the side plates 58 of the cover 44 in a snap-fit manner, so that the cover 44 can be attached to the case body 42 (see FIGS. 1 to 3). As the cover 44 is attached to the case body 42, the outer peripheral portion 20a of the filter element 20 may be clamped between the side plates 54 of the case body 42 and the side plates 58 of the cover 44 (see FIG. 3). The upper end of the connecting tube 24 of the filter member 16 may extend upwardly through the opening formed in the top plate 57 of the cover 44. In this way, a space having a given volume or a given distance may be ensured between the upper filter element 20A and the top plate 57 of the cover 44. With this arrangement, the space capable of temporary storing the fuel may be defined within the cover 44 at a position on the upper side of the upper filter element 20A. In this way, the filter case 18 may serve as a space-keeping device or an outer device disposed on the outer side of the filter member 16.

As viewed downwardly in the overlaying direction of the lower filter element 20B over the space-keeping member 52 (downwardly in FIG. 3), the crosspieces 47 of the space-keeping member 52 may be positioned between the fusion-bonded portions 26 of the lower filter element 20B so as to be spaced apart from the fusion-bonded portions 26 (see FIG. 2). In addition, at the central portion of each of the openings 49 of the space-keeping member 52, one fusion-bonded portion 26 of the fusion-bonded portions 26 of the lower filter element 20B is positioned.

During operation, the fuel filtration device 10 may be placed on the bottom wall portion 13 of the fuel tank 12 (see FIG. 3). The connecting tube 24 may be connected to the fuel inlet member 14 located within the fuel tank 12. As the fuel pump (not shown) is driven, a negative pressure may be applied to the space 21 within the filter element 20 of the filter member 16. Then, fuel stored within the fuel tank 12 may flow into the space 21 after being filtered by the filter element 20. Thereafter, the fuel may flow from the space 21 to be supplied to the engine via the connecting portion 36 and the connecting tube 24.

In the above embodiment, the filter member 16 of the fuel filtration device 10 (see FIG. 3) includes the filter element 20 formed to have a bag-shape, and the inner frame member 22 is disposed within the space 21 of the filter element 20. The space-keeping member 34 of the inner frame member 22 may serve to ensure that the space 21 has a given volume or a given distance between the upper and lower filter elements 20A and 20B. Therefore, it is possible to minimize the passage sectional area for the flow of fuel through the space 21. Hence, it is possible to inhibit the loss of fuel pressure.

In addition, in the case of the filter member 16 of the above embodiment, as viewed from the upper side with respect to the overlaying direction of the upper filter element 20A over the space-keeping member 34 of the inner frame member 22, the crosspieces 30 of the space-keeping member 34 may be positioned between the fusion-bonded portions 26 of the upper filter element 20A so as to be spaced apart from the fusion-bonded portions 26 (see FIG. 4). With this arrangement, the fusion-bonded portions 26 may be positioned to be spaced apart from the crosspieces 30 at opening-opposing portions of the upper filter element 20A opposed to the openings 32 of the space-keeping member 34. Therefore, it is possible to inhibit the opening-opposing portions of the upper filter element 20A from swelling due to the action of the fuel. This may provide a beneficial effect of preventing the opening-opposing portions of the upper filter element 20A from being flexed by the drawn fuel, inhibiting reduction in the flow passage area of the space 21 of the filter element 20, and preventing a loss in fuel pressure. In addition, due to the presence of the crosspieces 30 of the space-keeping member 34, portions of the upper filter element 20A positioned at intermediate positions between the fusion-welded portions 26 may be inhibited from swelling due to the action of the fuel.

Further, in the above embodiment, the filter case 18 has the case body 42 disposed on the outer side of the filter member 16, and the space-keeping member 52 is disposed between the surface of the bottom wall portion 13 of the fuel tank 12 and the surface of the lower filter element 20B opposed thereto. Therefore, it is possible to ensure that the space having a given volume or a given distance is defined between the surface of the bottom wall portion 13 of the fuel tank 12 and the surface of the lower filter element 20B opposed thereto. In this way, it is possible to prevent the lower filter element 20B from contacting the bottom wall portion 13 of the fuel tank 12. As a result, the lower filter element 20B may not suffer damage, such as perforation or breakage, which may be caused by the contact with the bottom wall portion 13.

Furthermore, in the above embodiment, as viewed downwardly in the overlaying direction of the lower filter element 20B over the space-keeping member 52, the crosspieces 47 of the space-keeping member 52 may be positioned between the fusion-bonded portions 26 of the lower filter element 20B so as to be spaced from the fusion-bonded portions 26 (see FIG. 2). With this arrangement, the fusion-bonded portions 26 may be positioned to be spaced apart from the crosspieces 47 at opening-opposing portions of the lower filter element 20B opposed to the openings 49 of the space-keeping member 52. Therefore, it is possible to inhibit the opening-opposing portions of the lower filter element 20B from swelling due to the action of the fuel. This may provide a beneficial effect in preventing the opening-opposing portions of the lower filter element 20B from contacting the bottom wall portion 13 of the fuel tank 12. Hence, also in this respect, the lower filter element 20B may not suffer damage, such as perforation or breakage, by the bottom wall portion 13. In addition, due to the presence of the crosspieces 47 of the space-keeping member 52, portions of the lower filter element 20B positioned at intermediate positions between the fusion-welded portions 26 may be inhibited from swelling due to the action of the fuel.

Still furthermore, the fusion-bolding portion 26(A) of the lower filter element 20B positioned within the connecting member opposing region of the lower filter element 20B opposed to the connecting member 40 (see FIGS. 3 and 4) may prevent the connecting member opposing region of the lower filter element 20B from swelling or flexing due to the action of the drawn fuel. In this way, it is possible to prevent reduction of the flow passage area of space 21 of the filter element 20 and to prevent blockage of the fuel inlet member 14, which may be caused by the flexing of the connection member opposing region of the lower filter element 20B. As a result, it is possible to prevent a loss in fuel pressure also in this respect.

Second Embodiment

A second embodiment will now be described with reference to FIG. 5. The second embodiment is a modification of the first embodiment. Therefore, in FIG. 5, like members are given the same reference numerals as the first embodiment, and the description of these members will not be repeated.

Figure 5:
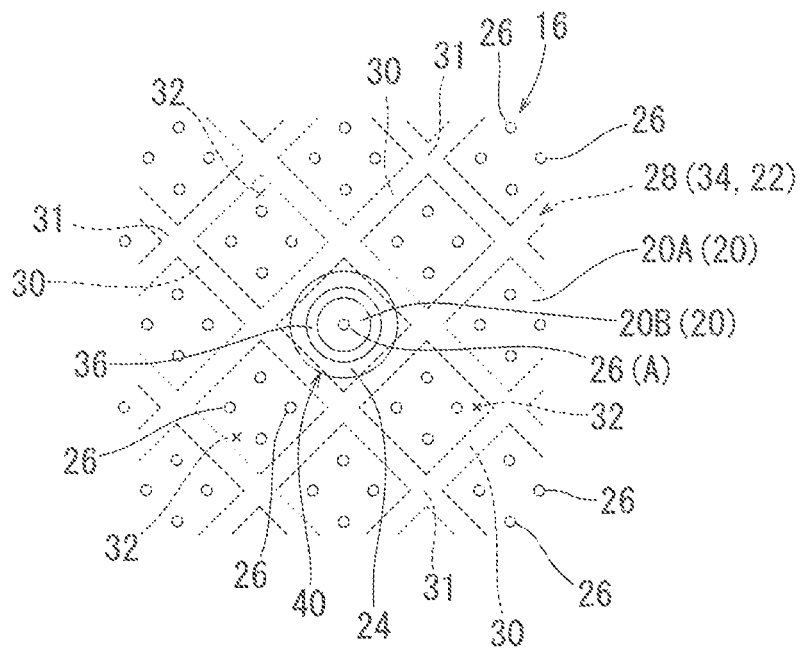
FIG. 5 is a plan view of a part of a filter member of a fuel filtration device according to a second embodiment.

As shown in FIG. 5, in this embodiment, the upper filter element 20A may have a plurality of fusion-bonded portions 26 (four fusion-bonded portions 26 in this embodiment) in each of the opening-opposing portions respectively opposed to the openings 32 of the space-keeping member 34. With this arrangement, it is possible to further inhibit the opening-opposing portions of the upper filter element 20A from swelling due to the action of the fuel.

Third Embodiment

A third embodiment will now be described with reference to FIG. 6. Also, the third embodiment is a modification of the first embodiment. Therefore, in FIG. 6, like members are given the same reference numerals as the first embodiment, and the description of these members will not be repeated.

Figure 6:
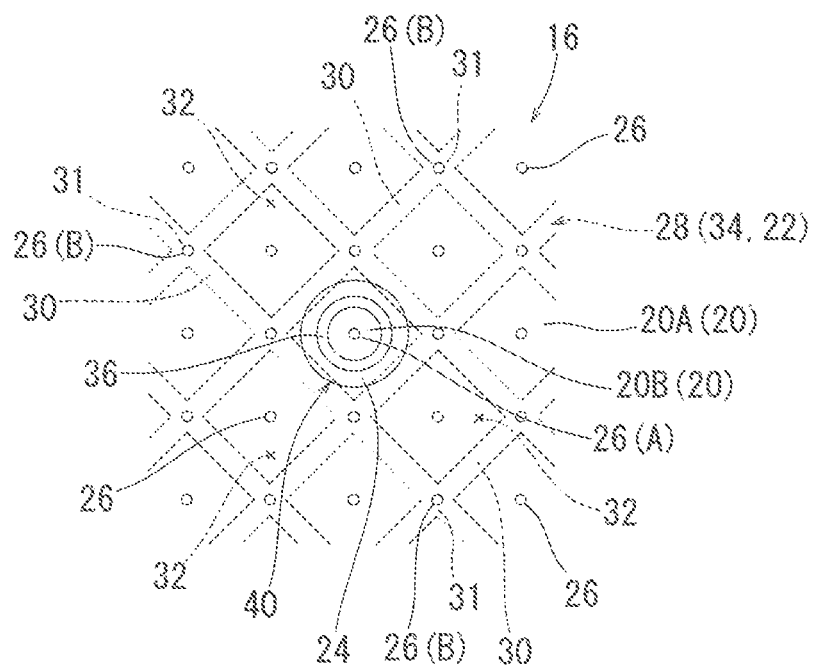
FIG. 6 is a plan view of a part of a filter member of a fuel filtration device according to a third embodiment.

As shown in FIG. 6, in this embodiment, the fusion bonded portions 26 of the upper filter element 20A may include those (indicated by reference numeral 26(B)) positioned to be opposed to the intersecting portions 31 where the crosspieces 30 of the space-keeping member 34 intersect with each other. With this arrangement, it is possible to inhibit portions of the filter element 20A opposing to the intersecting portions 31 from swelling due to the action of the fuel.

Fourth Embodiment

A fourth embodiment will now be described with reference to FIG. 7. The fourth embodiment is a modification of the second embodiment. Therefore, in FIG. 7, like members are given the same reference numerals as the second embodiment, and the description of these members will not be repeated.

Figure 7:
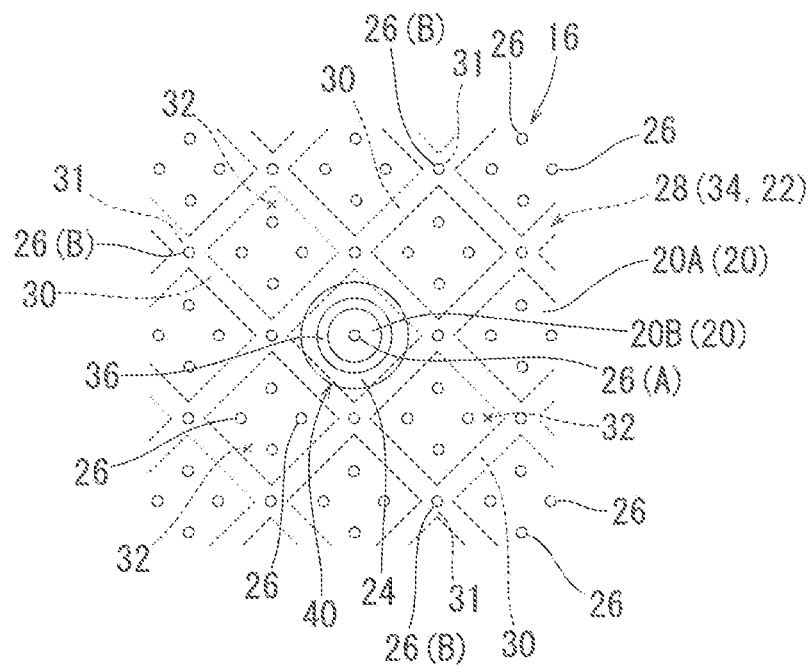
FIG. 7 is a plan view of a part of a filter member of a fuel filtration device according to a fourth embodiment.

As shown in FIG. 7, in this embodiment, the fusion bonded portions 26 of the upper filter element 20A may further include fusion bonded portions 26(B) that are the same as those described in connection with the third embodiment and positioned to be opposed to the intersecting portions 31 of the crosspieces 30 of the space-keeping member 34.

Fifth Embodiment

Figure 8:
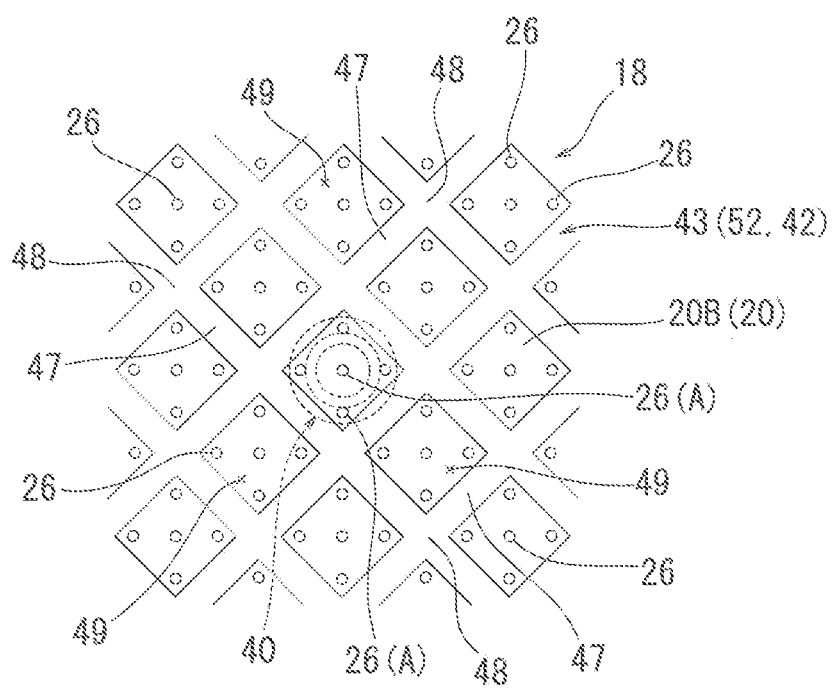
FIG. 8 is a bottom view of a part of a filter case of a fuel filtration device according to a fifth embodiment.

A fifth embodiment will now be described with reference to FIG. 8. The fifth embodiment is a modification of the first embodiment. Therefore, in FIG. 8, like members are given the same reference numerals as the first embodiment, and the description of these members will not be repeated.

According to this embodiment, a plurality of fusion-bonded portions 26 (five fusion-bonded portions 26 in FIG. 8) are provided within each of the opening-opposing portions of the lower filter element 20B (see FIG. 2) opposed to the openings 49 of the bottom plate 43 of the space-keeping member 52. Therefore, it is possible to further inhibit the opening opposing portions of the lower filter element 20B from swelling due to the action of the fuel.

In addition, the lower filter element 20B includes a plurality of fusion bonded portions 26(A) positioned within the connecting member opposing region of the lower filter element 20B opposed to the connecting member 40. In this way, it is possible to further prevent the connecting member opposing region from swelling or flexing due to the action of the drawn fuel.

Sixth Embodiment

A sixth embodiment will now be described with reference to FIG. 9. The sixth embodiment is a modification of the first embodiment. Therefore, in FIG. 9, like members are given the same reference numerals as the first embodiment, and the description of these members will not be repeated.

Figure 9:
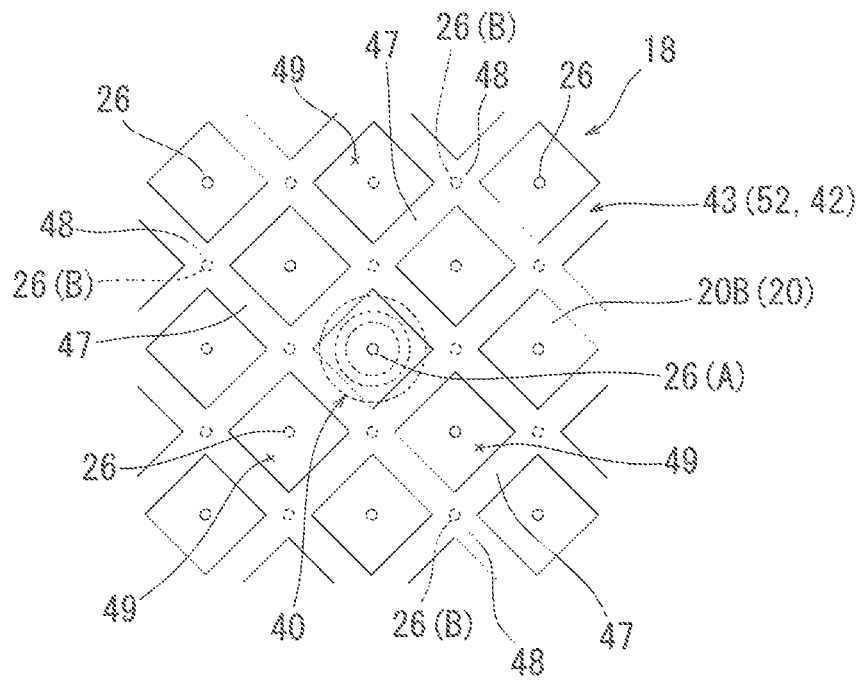
FIG. 9 is a bottom view of a part of a filter case of a fuel filtration device according to a sixth embodiment.

As shown in FIG. 9, in this embodiment, the fusion bonded portions 26 of the lower filter element 20B may include those (indicated by reference numeral 26(B)) positioned to be opposed to the intersecting portions 48 where the crosspieces 47 of the space-keeping member 52 intersect with each other. With this arrangement, it is possible to inhibit portions of the filter element 20B opposing to the intersecting portions 48 from swelling due to the action of the fuel.

Seventh Embodiment

A seventh embodiment will now be described with reference to FIG. 10. The seventh embodiment is a modification of the fifth embodiment. Therefore, in FIG. 10, like members are given the same reference numerals as the fifth embodiment, and the description of these members will not be repeated.

Figure 10:
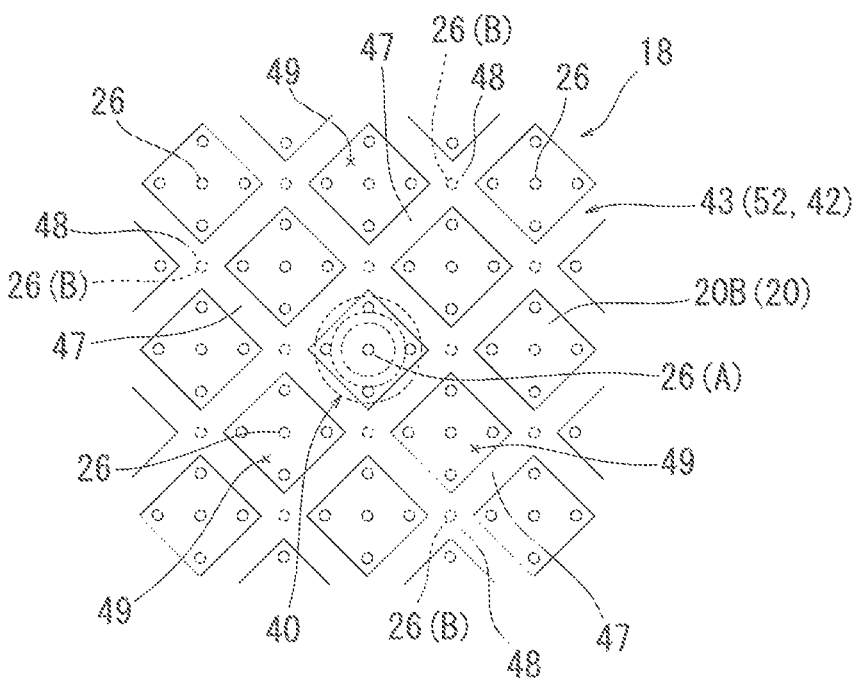
FIG. 10 is a bottom view of a part of a filter case of a fuel filtration device according to a seventh embodiment.

As shown in FIG. 10, in this embodiment, the fusion bonded portions 26 of the lower filter element 20B may include those (indicated by reference numeral 26(B)) positioned to be opposed to the intersecting portions 48 where the crosspieces 47 of the space-keeping member 52 intersect with each other in the same manner as the sixth embodiment (see FIG. 9).

Other Possible Modifications

The above embodiments may be modified in various ways. For example, the fuel filtration device 10 may be configured without the filter case 18. The fusion-bonded portions 26 may have various shapes other than a circular shape. For example, the fusion-bonded portions 26 may have a polygonal shape, such as a triangular or rectangular shape, + (plus) shape, – (minus) shape, or an elliptical shape. It may be also possible that the fusion-bonded portions 26 have different shapes from each other. A part of the filter member 20 may be made of a non-filtration material through which the fuel cannot pass through. The inner frame member 22 may have an additional grid-like plate member that faces the lower filter element 20B and is configured to be similar to the grid-like plate member 28. The filter member 16 may have a shape other than a rectangular shape. For example, the filter member 16 may have a polygonal shape, such as a triangular shape and a hexagonal shape. It may be also possible that the filter member 16 may have a circular shape or an elliptical shape. Similarly, the openings 32 of the space-keeping member 34 of the inner frame member 22 and/or the openings 49 of the space-keeping member 52 of the case body 42 may not be limited in having a rectangular shape or a rhombic shape but may have a triangular shape, a parallelogram shape, a polygonal shape such as a hexagonal shape, a circular shape or an elliptical shape.

Further, and particularly in cases where the upper filter element 20A has a large number of fusion-bonded portions 26, it may be possible that no crosspiece 30 is positioned between some of the fusion-bonded portions 26. Similarly, and particularly cases where the lower filter element 20B has a large number of fusion-bonded portions 26, it may be possible that no crosspiece 47 is positioned between some of the fusion-bonded portions 26. Similarly, and particularly in cases where the space-keeping member 34 of the inner frame member 22 has a large number of openings 32, it may be possible that no fusion-bonded portion 26 of the upper filter element 20A opposes some of the openings 32. Similarly, and particularly in cases where the space-keeping member 52 of the case body 42 has a large number of openings 49, it may be possible that no fusion-bonded portion 26 of the lower filter element 20B opposes some of the openings 49.

Furthermore, the fusion-bonded portions 26 of the upper filter element 20A may include those opposed to the frame portion 28 and/or the crosspieces 30 of the space-keeping member 34. Similarly, the fusion-bonded portions 26 of the lower filter element 20B may include those opposed to the frame portion 46 and/or the crosspieces 47 of the space-keeping member 52.

What is claimed is:

1. A fuel filtration device comprising:
    a filter member having a filter element formed by a plurality of filter sheets overlapped with each other and joined together at a plurality of fusion-bonded portions, the filter element having a space defined therein; and
    a space-keeping member having a grid-shaped space-keeping member having a plurality of crosspieces, the space-keeping member facing an inner surface or an outer surface of the filter element;
    wherein:
        the space defined in the filter element communicates with a fuel inlet member disposed within a fuel tank, so that fuel is drawn from the fuel tank via the fuel inlet member;
        as viewed in an overlapping direction of the filter element and the space-defining member with each other, the plurality of crosspieces of the space-keeping member are arranged to define a plurality of openings;
        each of the plurality of openings are arranged such that at least one of the fusion-bonded portions is positioned therein as viewed in the overlapping direction;
        the plurality of openings comprise a plurality of first openings, wherein for each of the first openings, only one fusion-bonded portion is disposed at a substantially central position within each first opening, and at least one crosspiece is located between the fusion-bonded portions of any two of the first openings and one of the crosspieces is located between the fusion-bonded portions of any two of the openings disposed adjacent to each other.

2. The fuel filtration device according to claim 1, wherein:
    the filter element has a bag shape; and
    the space-keeping member is disposed within the space of the filter element.

3. The fuel filtration device according to claim 1, wherein the space-keeping member is disposed outside of the space defined by the filter element.

4. The fuel filtration device according to claim 1, wherein:
    the filter member further includes a connecting member connected to the fuel inlet member;
    the filter element includes a region opposed to the connecting member; and as viewed in an overlapping direction of the connecting member, at least another of the fusion-bonded portions is positioned within the region opposed to the connecting member.

5. The fuel filtration device according to claim 1, wherein:
the plurality of crosspieces comprise a plurality of first crosspieces and a plurality of second crosspieces;
the plurality of first crosspieces extend substantially parallel to each other in a first direction;
the plurality of second crosspieces extend substantially parallel to each other in a second direction that intersects the first direction; and
one of the second crosspieces is located at a substantially intermediate position between the fusion-bonded portions of any two of the first openings that are arranged adjacent to each other in the first direction.

6. A fuel filtration device comprising:
a filter element having a plurality of fusion-bonded portions and having a space defined therein; and
a space-keeping member having a plurality crosspieces defining a plurality of openings therebetween, the space-keeping member facing to a surface of the filter element in a facing direction;
wherein the plurality of openings each include only one fusion-bonded portion arranged therein at a substantially central position as viewed in the facing direction; and
wherein at least one crosspiece is located between the fusion-bonded portions of any two of the plurality of openings and one of the crosspieces is located between the fusion-bonded portions of any two of the openings disposed adjacent to each other.

7. The fuel filtration device according to claim 6, wherein the space-keeping member is disposed within the space of the filter element.

8. The fuel filtration device according to claim 6, wherein the space-keeping member is disposed external to the space defined by the filter element.

9. The fuel filtration device according to claim 6, wherein the fusion-bonded portions include a first set of fusion-bonded portions that overlap with the plurality of crosspieces of the space-keeping member in the facing direction.

10. The fuel filtration device according to claim 6, wherein:
the plurality of crosspieces comprise a plurality of first crosspieces and a plurality of second crosspieces;
the plurality of first crosspieces extend substantially parallel to each other in a first direction;
the plurality of second crosspieces extend substantially parallel to each other in a second direction that intersects the first direction; and
one of the second crosspieces is located at a substantially intermediate position between the fusion-bonded portions of any two of the openings that are arranged adjacent to each other in the first direction.

* * * * *